United States Patent [19]

Bernitz et al.

[11] Patent Number: 4,643,923
[45] Date of Patent: Feb. 17, 1987

[54] PROFILED STRIP

[75] Inventors: Bernhard Bernitz; Richard Brodmann, both of Hanover; Dietmar Hermann, Garbsen, all of Fed. Rep. of Germany

[73] Assignee: Continental Gummi-Werke Aktiengesellschaft, Hanover, Fed. Rep. of Germany

[21] Appl. No.: 833,902

[22] Filed: Feb. 26, 1986

[30] Foreign Application Priority Data

Feb. 26, 1985 [DE] Fed. Rep. of Germany ....... 3506720

[51] Int. Cl.⁴ ............................................... E06B 7/16
[52] U.S. Cl. ........................................ 428/31; 49/490; 428/122; 428/141; 428/358
[58] Field of Search ................. 49/490, 491, 495, 488; 428/31, 122, 358

[56] References Cited

U.S. PATENT DOCUMENTS

| 3,585,099 | 6/1971 | Van Buskirk | 428/90 X |
| 3,854,247 | 12/1974 | Stark et al. | 49/495 |
| 4,246,303 | 1/1981 | Townsend | 428/31 |
| 4,411,941 | 10/1983 | Azzola | 428/122 |

FOREIGN PATENT DOCUMENTS 2145142 3/1985 United Kingdom ................. 49/488

Primary Examiner—Henry F. Epstein
Attorney, Agent, or Firm—Becker & Becker, Inc.

[57] ABSTRACT

A profiled rubber strip seal for bordering window and door openings. To simplify installation or, for example in the case of sliding windows, to promote relative movement between the strip and window panes, such seals are provided with overlay strips of low-friction material. The sliding properties of the overlay strip are improved, independent of the material of the strip, by applying to the latter a surface texture, for example by impressing such a structural quality in the strip, or by exposing the strip to particles.

9 Claims, 1 Drawing Figure

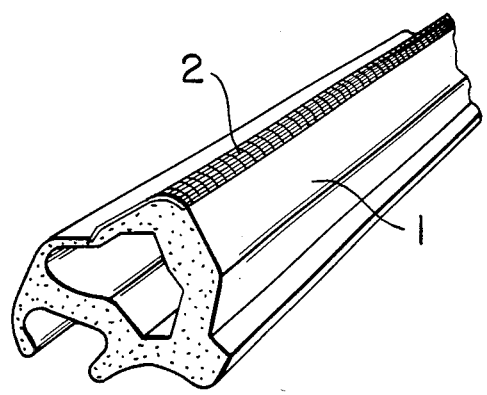

PROFILED STRIP

BACKGROUND OF THE INVENTION

The present invention relates to a profiled strip for sealingly bordering window or door openings in vehicles and buildings, with these openings being provided with panes or the like that are slidingly movable relative to the profiled strip.

Sliding windows and other window panes, door panels, etc. that can move encounter an undesired high resistance to sliding at the profiled rubber strip seals against which these panes rest, with this resistance being due to the naturally present surface character of the seals. It is therefore long been the practice to provide the profiled strands, at least in those peripheral regions where sliding contact is made, with a surface overlay that favors sliding. For reasons of installation, as well as with a view to the changing stresses that constantly occur during use, a fixed, self-substance bonding of the overlay to the body of the strip is indispensable. Depending upon the difference in the materials between the overlay and the main strip, a bond having the necessary resistance to separation and the necessary durability is often difficult to produce. Attainment of this bond is particularly difficult when fluorine-containing synthetic materials, such as polytetrafluoroethylene, are used for the overlay. On the other hand, these synthetic materials have outstanding sliding characteristics that are better than those of any other usable overlay materials.

It is therefore an object of the present invention to provide a novel construction of a two-material profiled strip that has the desired good sliding characteristics in the contact zone while at the same time enabling use of conventional methods to produce a high strength bond regardless of the type of overlay material that is used.

BRIEF DESCRIPTION OF THE DRAWING

This object, and other objects and advantages of the present invention, will appear more clearly from the following specification in conjunction with the accompanying schematic drawing, which is a perspective view of a portion of one exemplary embodiment of the two-material profiled strand of the present invention.

SUMMARY OF THE INVENTION

The profiled strip of the present invention comprises a profiled main strip made of rubber or rubber-like elastomeric material, and an overlay strip that is adhesively secured to the surface of the main strip in that region thereof where the latter comes into contact with the pane or the like; the overlay strip is made of a friction-reducing material that differs from the material of the main strip; in addition, the surface of the overlay strip remote from the main strip is textured, i.e., it has a structural quality. This texturing is advisably in the order of magnitude of microns.

The texturing can be applied to the overlay strip by various methods, and can also be applied either prior to or after the bonding of the overlay strip with the profiled main strip. For example, pursuant to one proposal of the present invention, the overlay strip can be provided with a continuous succession of recessed portions or elevations that are imprinted or impressed next to one another, and which can be interconnected. Alternatively, however, it would also be possible to remove portions of the surface of the overlay strip by roughening the latter; this could be accomplished as a result of exposing the surface of the overlay strip to particles, for example via sandblasting.

The present invention utilizes the surprising effect of being able to achieve a distinctly improved sliding capability with a surface treatment that would actually appear to inherently lead to a greater resistance to movement. This unexpected advantageous effect is probably based on a resolution of the otherwise linear or surface contact with the pane or the like, which is movable relative to the profiled strip, into a plurality of individual contact points. This results in having over the entire sealing periphery an unobstructed air interchange through and into the contact zone, thus preventing any undesirable suction effect right from the beginning. Furthermore, it has been shown that the novel profiled strip is not subject to the danger of freezing to the panes, door panels, or the like, or at least not to the normal extent, even when there is a very heavy frost.

The profiled strip of the present invention is not limited to the use of specific overlay materials. Rather, the present invention offers the possibility, in place of the difficult-to-handle, fluorine-containing synthetic materials, of using overlay strips made of other thermoplastic synthetic materials, such as polyamide, polyvinyl chloride, etc., that are easier to adhesively bond to the rubber of the profiled main strip.

DESCRIPTION OF PREFERRED EMBODIMENTS

Referring now to the drawing in detail, the illustrated profiled strip has as its main portion a profiled main strip 1 that is made of weather-resistant rubber. Only in that limited outer peripheral portion that comes into sliding contact with a non-illustrated pane of a sliding window is the main strip 1 provided with an overlay strip 2 that is securely applied thereto. The overlay strip 2 is provided with a surface texture that, for example, is impressed therein. This texturing or structural quality can be in the form of a roughness pattern which is of a micron order of magnitude or is otherwise very small.

The present invention is, of course, in no way restricted to the specific disclosure of the specification and drawing, but also encompasses any modifications within the scope of the appended claims.

What we claim is:

1. A profiled strip for sealingly bordering window or door openings in vehicles and buildings, with said openings being provided with panes or the like that are slidingly movable relative to said profiled strip, which comprises:
   a profiled main strip made of elastomeric material selected from the group consisting of rubber and rubber-like elastomeric materials; and
   an overlay strip adhesively secured to the surface of said main strip in that region thereof where the latter comes into contact with said pane or the like; said overlay strip is made of a friction-reducing material that differs from the material of said main strip; in addition, that surface of said overlay strip that is remote from said main strip is textured.

2. A profiled strip according to claim 1, in which said textured surface of said overlay strip is textured in a micron order of magnitude.

3. A profiled strip according to claim 2, in which said overlay strip is provided with a continuous succession of recessed portions that are impressed next to one another.

4. A profiled strip according to claim 3, in which said recessed portions are interconnected.

5. A profiled strip according to claim 2, in which said overlay strip is provided with a continuous succession of elevations that are impressed next to one another.

6. A profiled strip according to claim 5, in which said elevations are interconnected.

7. A profiled strip according to claim 2, in which said textured surface is a roughened surface produced by removal of a portion of said surface.

8. A profiled strip according to claim 7, in which said roughened surface is the result of exposure of said surface to particles.

9. A profiled strip according to claim 8, in which said particle exposure comprises sandblasting.

* * * * *